United States Patent
Ogawa

(10) Patent No.: US 6,885,419 B2
(45) Date of Patent: Apr. 26, 2005

(54) LIGHT-REFLECTION TYPE LIQUID CRYSTAL DISPLAY DEVICE WITH OPERATION PANEL SUPPORTED ON SHIELD AND FRAME

(75) Inventor: Toshihisa Ogawa, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 7 days.

(21) Appl. No.: 10/448,374

(22) Filed: May 30, 2003

(65) Prior Publication Data

US 2003/0223024 A1 Dec. 4, 2003

(30) Foreign Application Priority Data

May 30, 2002 (JP) ........................................ 2002-157423

(51) Int. Cl.[7] ..................... G02F 1/1335; G02F 1/1333; F21V 7/04
(52) U.S. Cl. ........................... 349/113; 349/58; 349/62; 349/63; 362/31
(58) Field of Search .............................. 349/58, 61–63, 349/113; 362/20, 31

(56) References Cited

U.S. PATENT DOCUMENTS

| | | | | |
|---|---|---|---|---|
| 5,146,354 A | * | 9/1992 | Plesinger | 349/59 |
| 5,280,372 A | * | 1/1994 | Horiuchi | 349/65 |
| 5,966,191 A | * | 10/1999 | Lee | 349/58 |
| 6,388,722 B1 | * | 5/2002 | Yoshii et al. | 349/62 |
| 6,490,016 B1 | * | 12/2002 | Koura | 349/58 |
| 6,525,789 B1 | * | 2/2003 | Lee | 349/58 |
| 6,593,979 B1 | * | 7/2003 | Ha et al. | 349/58 |
| 6,636,282 B1 | * | 10/2003 | Ogawa et al. | 349/58 |
| 6,654,078 B1 | * | 11/2003 | Kato et al. | 349/58 |
| RE38,516 E | * | 5/2004 | Hasegawa et al. | 349/58 |

FOREIGN PATENT DOCUMENTS

| | | |
|---|---|---|
| JP | 2699853 | 9/1997 |
| JP | 11-149252 | 6/1999 |
| JP | 11-219610 | 8/1999 |
| JP | 2000-147499 | 5/2000 |

* cited by examiner

Primary Examiner—Tarifur R. Chowdhury
(74) Attorney, Agent, or Firm—Foley & Lardner LLP

(57) ABSTRACT

A light-reflection type liquid crystal display device includes (a) a liquid crystal display panel, (b) a polarizer mounted on the liquid crystal display panel, (c) a light-guide mounted on the polarizer, (d) a light source arranged adjacent to an end of the light-guide for supplying light to the liquid crystal display panel through the light-guide, (e) an operation panel mounted above the light-guide for operating the light-reflection type liquid crystal display device, (f) a chassis for supporting the liquid crystal display panel therewith, (g) a frame covering the light source therewith, the frame having an opening facing the light-guide, and (h) a shield coupled to the chassis and covering the light-guide therewith except a portion of the light-guide facing the light source, the shield cooperating with the frame to support the operation panel therewith.

14 Claims, 7 Drawing Sheets

LIGHT-REFLECTION TYPE LIQUID CRYSTAL DISPLAY DEVICE WITH OPERATION PANEL SUPPORTED ON SHIELD AND FRAME

BACKGROUND OF THE INVENTION

1. Field of the Invention

The invention relates to a liquid crystal display device, and more particularly to a light-reflection type liquid crystal display device.

2. Description of the Related Art

Since a portable terminal device such as a portable personal computer can accumulate power in limited amount, parts constituting a portable terminal device are required to consume small power. Accordingly, not a display unit which can emit light by itself, but a liquid crystal display device which consumes small power is predominantly used as a display unit for a portable terminal device.

However, a liquid crystal display device does not have a function of emitting light by itself, and hence, has to include a light source. In accordance with a light-source, a liquid crystal display device is grouped into a light-reflection type liquid crystal display device, a light-transmission type liquid crystal display device, and a combination type liquid crystal display device.

A light-transmission type liquid crystal display device has a back-light source by which the device can display images.

A light-reflection type liquid crystal display device includes a light-reflector therein, and uses external light entering into the device and reflecting at the light-reflector, as a light source. Hence, a light-reflection type liquid crystal display device is not necessary to include a back-light source unlike a light-transmission type liquid crystal display device.

A combination type liquid crystal display device includes a first section fabricated as a light-transmission type liquid crystal display device and a second section fabricated as a light-reflection type liquid crystal display device.

A light-reflection type liquid crystal display device consumes smaller power and can be fabricated thinner and lighter than a light-transmission type liquid crystal display device, and hence, is mainly used as a display unit for a portable terminal device. This is because a light-reflection type liquid crystal display device uses external light entering thereinto and reflecting at a light-reflector for displaying images, and hence, is necessary to have a back-light source unlike a light-transmission type liquid crystal display device.

However, since a light-reflection type liquid crystal display device uses external light as a light source, it is difficult or almost impossible for a user to clearly see displayed images, if it is dark around the device.

In order to solve such a problem, a light-reflection type liquid crystal display device designed to include a preliminary light source which supplies light to the device through a light-guide has been suggested, for instance, in Japanese Patent No. 2699853 (Japanese Patent Application Publication No. 7-199184), and Japanese Patent Application Publications Nos. 11-149252, 11-219610 and 2000-147499.

FIG. 1 is a cross-sectional view of an example of a conventional light-reflection type liquid crystal display device including a preliminary light source.

A conventional light-reflection type liquid crystal display device 100 illustrated in FIG. 1 is comprised of a liquid crystal display panel 101, a polarizer 102 lying on the liquid crystal display panel 101 in such a direction as facing a viewer, a light-guide 103 mounted on the polarizer 102, a light source 104 located adjacent to an end of the light-guide 103, and supplying light to the liquid crystal display panel 101 through the light-guide 103, an operation panel 105 arranged above the light-guide 103 for operating the liquid crystal display device 100, and a chassis 106 supporting the liquid crystal display panel 101.

Light emitted from the light source 104 reaches the polarizer 102 through the light-guide 103, is polarized when passing through the polarizer 102, and reaches the liquid crystal display panel 101 to thereby be used for displaying images.

Hereinbelow is discussed as to how the operation panel 105 is supported. FIG. 2 is a cross-sectional view of another conventional light-reflection type liquid crystal display device 110. Parts or elements that correspond to those of the liquid crystal display device illustrated in FIG. 1 have been provided with the same reference numerals.

In the liquid crystal display device 110 illustrated in FIG. 2, the light source 104 is covered with a frame 107 which is open only to the light-guide 103. A shield 108 having a reverse-L shaped cross-section is coupled to the chassis 106. The operation panel 105 is supported at its opposite ends on the shield 108, and fixed to the shield 108 through double-sided adhesive tape (not illustrated).

FIG. 3 is a cross-sectional view of still another conventional light-reflection type liquid crystal display device 120. Parts or elements that correspond to those of the liquid crystal display device illustrated in FIGS. 1 and 2 have been provided with the same reference numerals.

In the light-reflection type liquid crystal display device 120, the operation panel 105 is supported at a left end on the frame 107, and at a right end on the chassis 106.

As mentioned earlier, a liquid crystal display device is incorporated in various portable terminal devices because of small power consumption. A portable terminal device is presently required to fabricate smaller, and accordingly, a liquid crystal display device used in a portable terminal device is required to fabricate smaller, specifically, thinner, shorter and/or lower.

Considering the conventional light-reflection type liquid crystal display device 110 illustrated in FIG. 2 in view of such requirements, since the shield 108 is sandwiched between the operation panel 105 and the frame 107, the light-reflection type liquid crystal display device 110 has to be thicker to a degree corresponding to a thickness of the shield 108.

The conventional light-reflection type liquid crystal display device 120 illustrated in FIG. 3 has to be longer in width to a degree corresponding to a width A of the chassis 106 on which the operation panel 105 is supported at a right end.

As mentioned above, a structure for supporting the operation panel 105 makes it difficult for a liquid crystal display device to be fabricated thinner and shorter in the conventional light-reflection type liquid crystal display devices.

In addition, though the shield 108 is frame-shaped in the conventional light-reflection type liquid crystal display devices 110 and 120 illustrated in FIGS. 2 and 3, the shield 108 cannot provide performance associated with its size.

SUMMARY OF THE INVENTION

In view of the above-mentioned problems in the conventional light-reflection type liquid crystal display device, it is an object of the present invention to provide a light-reflection type liquid crystal display device which can be fabricated thinner and shorter.

In one aspect of the present invention, there is provided a light-reflection type liquid crystal display device including (a) a liquid crystal display panel, (b) a polarizer mounted on the liquid crystal display panel, (c) a light-guide mounted on the polarizer, (d) a light source arranged adjacent to an end of the light-guide for supplying light to the liquid crystal display panel through the light-guide, (e) an operation panel mounted above the light-guide for operating the light-reflection type liquid crystal display device, (f) a chassis for supporting the liquid crystal display panel therewith, (g) a frame covering the light source therewith, the frame having an opening facing the light-guide, and (h) a shield coupled to the chassis and covering the light-guide therewith except a portion of the light-guide facing the light source, the shield cooperating with the frame to support the operation panel therewith.

It is preferable that the shield is detachably coupled to the chassis.

For instance, the shield may be formed with a plurality of openings, and the chassis may be formed with projections which fit into the openings, and vice versa.

It is preferable that one of plurality of the openings has an axis extending in a different direction from a direction in which an axis of another one of plurality of the openings extends.

It is preferable that one of the shield and the chassis is formed with a plurality of openings, and the other is formed with projections which fit into the openings, the shield is formed with a hook which makes abutment with the chassis, and the opening or projection of the shield is engaged to a first wall of the chassis and the hook is engaged to a second wall of the chassis facing the first wall.

It is preferable that the shield has an upper surface on a level with an upper surface of the frame when the shield is coupled to the chassis.

It is preferable that the operation panel is supported on both the shield and the frame at a side where the light source exists, and on the shield at an opposite side.

In another aspect of the present invention, there is provided a shield used in a light-reflection type liquid crystal display device including a liquid crystal display panel, a polarizer mounted on the liquid crystal display panel, a light-guide mounted on the polarizer, a light source arranged adjacent to an end of the light-guide for supplying light to the liquid crystal display panel through the light-guide, an operation panel mounted above the light-guide for operating the light-reflection type liquid crystal display device, a chassis for supporting the liquid crystal display panel therewith, and a frame covering the light source therewith, the frame having an opening facing the light-guide, the shield being coupled to the chassis and covering the light-guide therewith except a portion of the light-guide facing the light source, and the shield cooperating with the frame to support the operation panel therewith.

The advantages obtained by the aforementioned present invention will be described hereinbelow.

In the light-reflection type liquid crystal display device in accordance with the present invention, the operation panel is supported at one end thereof on both the shield and the frame. Hence, the shield and the frame do not overlap each other unlike the conventional light-reflection type liquid crystal display device. As a result, the light-reflection type liquid crystal display device in accordance with the present invention can be fabricated thinner by a thickness corresponding to a thickness of the shield, in comparison with the conventional light-reflection type liquid crystal display device.

In the light-reflection type liquid crystal display device in accordance with the present invention, the operation panel is supported on the shield at a side opposite to a side where the light source exists. Accordingly, it is no longer necessary to support the operation panel on the chassis having a width "A" unlike the conventional light-reflection type liquid crystal display device illustrated in FIG. 3. As a result, the light-reflection type liquid crystal display device in accordance with the present invention can be shorter in width by a width "A" of the chassis.

Furthermore, the shield in the present invention can be formed U-shaped. Accordingly, it is possible to reduce a volume of a material of which the shield is formed, relative to a conventional shield which is in the form of a frame. For instance, when a plurality of shields is cut out of a single plate, the greater number of shields can be taken out of a plate than a conventional shield by arranging openings of U-shaped shields to face each other. Thus, fabrication costs can be reduced in comparison with the conventional light-reflection type liquid crystal display device.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENT

A preferred embodiment in accordance with the present invention will be explained hereinbelow with reference to drawings.

Figure 4:
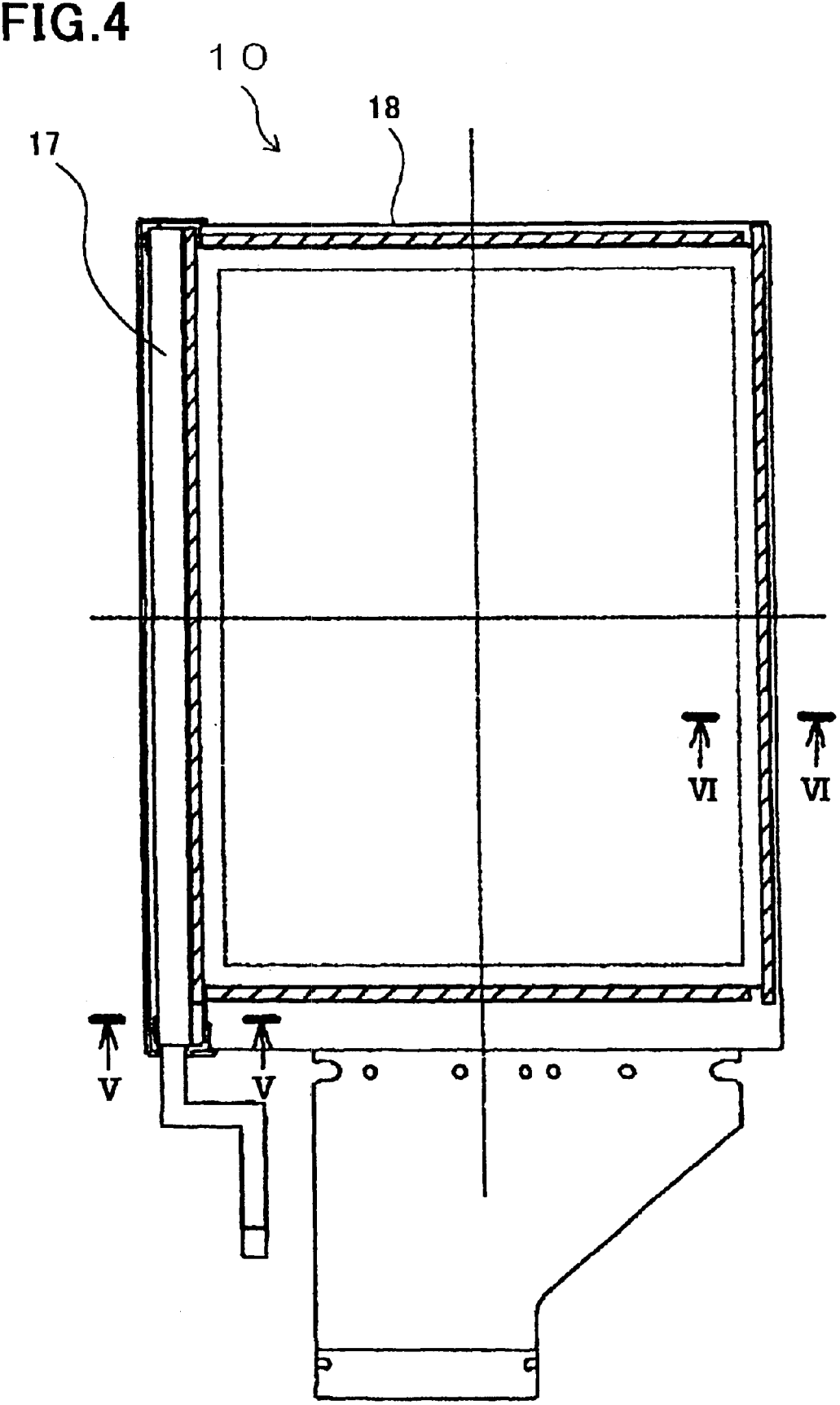
FIG. 4 is a plan view of a light-reflection type liquid crystal display device in accordance with a preferred embodiment of the present invention.
Figure 5:
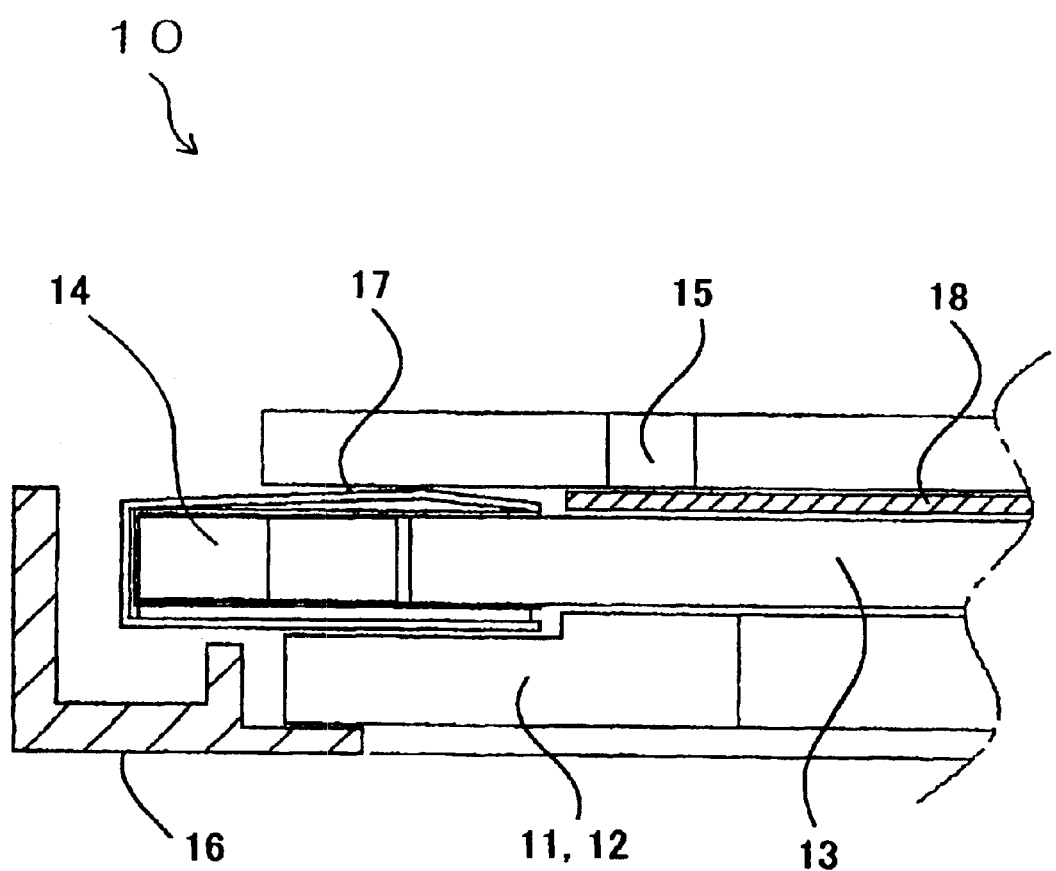
FIG. 5 is a cross-sectional view taken along the line V—V in FIG. 4.
Figure 6:
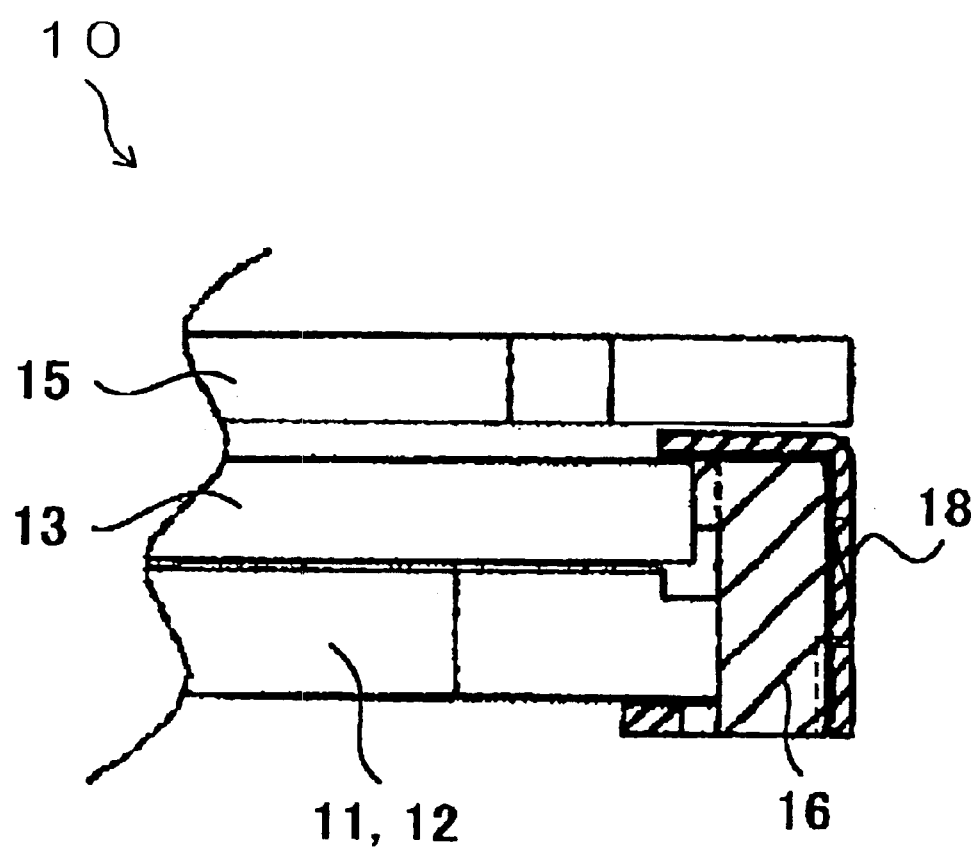
FIG. 6 is a cross-sectional view taken along the line VI—VI in FIG. 4.

FIG. 4 is a plan view of a light-reflection type liquid crystal display device 10 in accordance with a preferred embodiment of the present invention with a later mentioned operation panel being detached, FIG. 5 is a cross-sectional view taken along the line V—V in FIG. 4, and FIG. 6 is a cross-sectional view taken along the line VI—VI in FIG. 4.

The light-reflection type liquid crystal display device 10 is comprised of a liquid crystal display panel 11, a polarizer 12 lying on the liquid crystal display panel 11 in such a direction as facing a viewer, a light-guide 13 mounted on the polarizer 12, a light source 14 located adjacent to an end of the light-guide 13, and supplying light to the liquid crystal display panel 11 through the light-guide 13, an operation panel 15 arranged above the light-guide 13 for a user to operate the liquid crystal display device 10, a chassis 16 supporting the liquid crystal display panel 11, a frame 17 covering the light source 14 therewith and open only towards the light guide 13, and a shield 18 detachably coupled to the chassis 16, and covering the light-guide 13 therewith except an area facing the light source 14.

As illustrated in FIGS. 5 and 6, the operation panel 15 is supported at its opposite ends on the frame 17 and the shield 18, and fixed to the frame 17 and the shield 18 through a double-sided adhesive tape (not illustrated).

Figure 7:
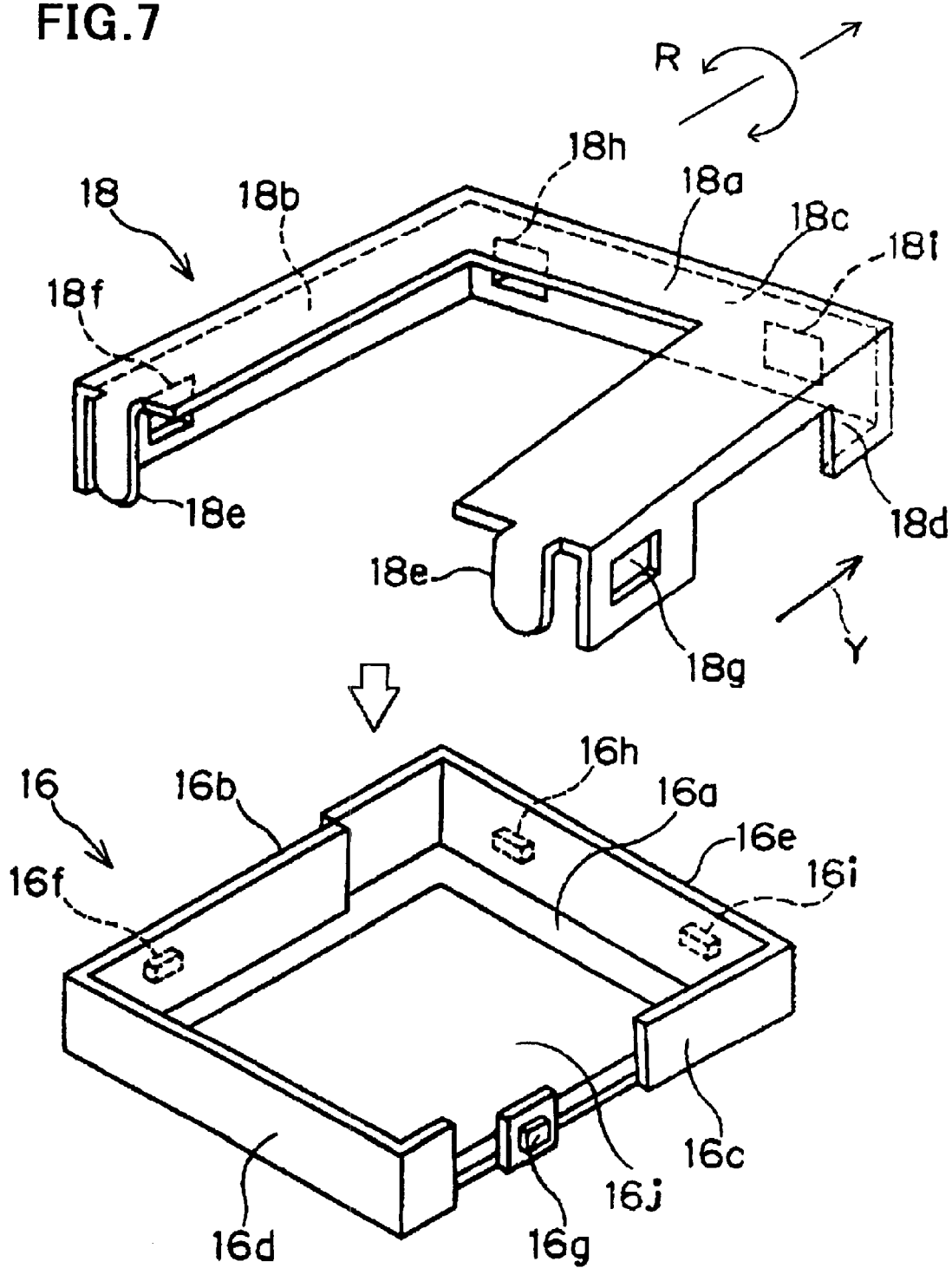
FIG. 7 is an exploded perspective view of a shield and a chassis in the light-reflection type liquid crystal display device illustrated in FIG. 4.

FIG. 7 is an exploded perspective view of the shield 18 and the chassis 16.

As illustrated in FIG. 7, the shield 18 includes an upper surface 18a which is rectangular, but is open at one of sides, and three sidewalls 18b, 18c and 18d downwardly perpendicularly extending from an outer edge of the upper surface 18a. The light guide 104 and the frame 107 are inserted into a space formed between the sidewalls 18b and 18d.

The shield 18 further includes a pair of hooks 18e downwardly extending from an edge of the upper surface 18a. The sidewalls 18b and 18d are formed in the vicinity of an edge of the upper surface 18a with rectangular openings 18f and 18g, respectively. The sidewall 18c is formed with openings 18h and 18i such that the openings 18h and 18i and the hooks 18e are located on lines parallel to the sidewalls 18b and 18d.

The chassis 16 is rectangular in the same size as a rectangle defined by the shield 18, when viewed from upward. The chassis 16 is comprised of a rectangular bottom 16a formed centrally with a rectangular opening 16j, and four sidewalls 16b, 16c, 16d and 16e upwardly extending from an outer edge of the bottom 16a.

The sidewall 16b is formed with an outwardly extending projection 16f which is fit into the opening 18f when the shield 18 is coupled to the chassis 16. The sidewall 16c is formed with an outwardly extending projection 16g which is fit into the opening 18g when the shield 18 is coupled to the chassis 16. The sidewall 16e is formed with outwardly extending projections 16h and 16i which are fit into the openings 18h and 18i when the shield 18 is coupled to the chassis 16.

When the shield 18 is coupled to the chassis 16, the hooks 18e make abutment with the sidewall 16d of the chassis 16. Thus, the shield 108 is prohibited in moving in a direction indicated with an arrow Y, and hence, it is ensured that the openings 18h and 18i are disengaged from the projections 16h and 16i.

As mentioned above, the shield 18 is detachably coupled to the chassis 16 by fitting the projections 16f, 16g, 16h and 16i of the chassis 16 into the associated openings 18f, 18g, 18h and 18i of the shield 18, respectively.

The shield 18 can be coupled to the chassis 16 by fitting the projections 16h and 16i into the openings 18h and 18i, respectively, and causing the hooks 18e to make abutment with the sidewall 16d. However, if a moment R around an axis extending in a length-wise direction of the sidewalls 18b and 18d is exerted on the shield 18, the shield 18 may be disengaged from the chassis 16. Hence, the projections 16f and 16g are fit into the openings 18f and 18g to ensure the shield 18 not to be disengaged from the chassis 16, even if the moment R is exerted on the shield 18.

An axis passing through centers of the openings 18f and 18g is perpendicular with an axis passing through a center of the opening 18h and an axis passing through a center of the opening 18i. Hence, by fitting the projections 16f to 16i into the associated openings 18f to 18i, even if a force acts on the shield 18 for releasing the shield 18 out of the chassis 16, such a force is cancelled with a coupling force between the opening 18h and projection 16h (or a coupling force between the opening 18i and the projection 16i) or a coupling force between the opening 18f and the projection 16f (or a coupling force between the opening 18g and the projection 16g), ensuring that the shield 18 is kept coupled to the chassis 16.

In the light-reflection type liquid crystal display device 10 in accordance with the embodiment, as illustrated in FIG. 5, the upper surface 18a of the shield 18 is almost on a level with an upper surface of the frame 17. As a result, the operation panel 15 is supported at a side closer to the light guide 14 on both the shield 18 and the frame 17 (see FIG. 5), and at an opposite side remoter from the light guide 14 on the shield 18 (see FIG. 6).

Figure 1:
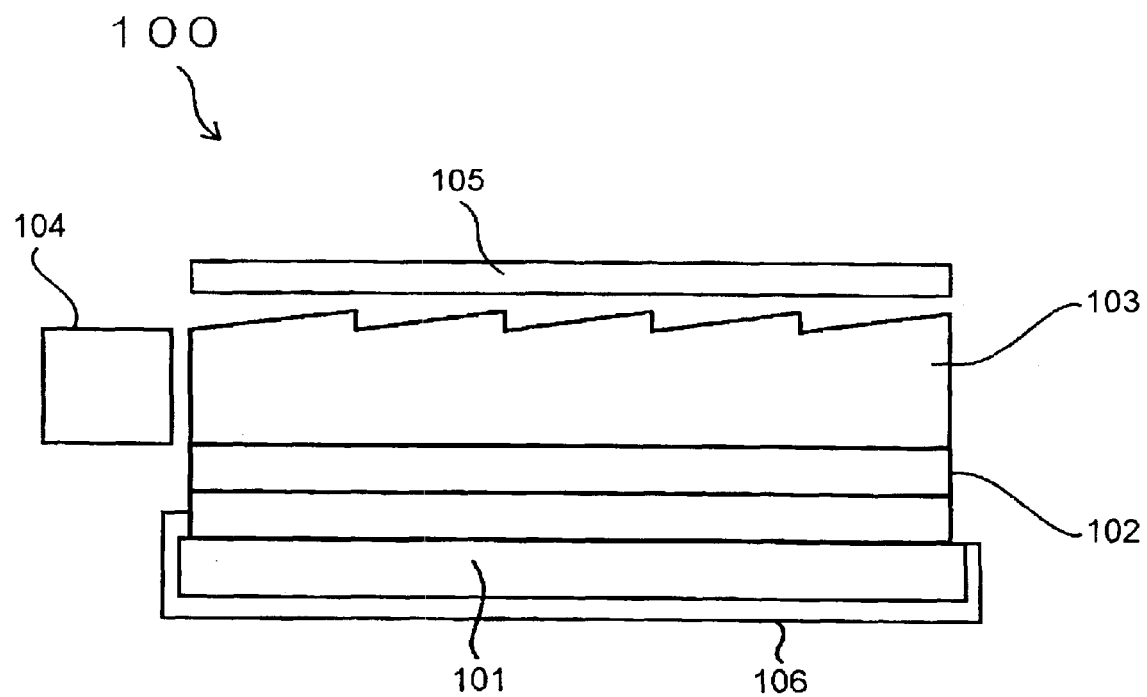
FIG. 1 is a cross-sectional view of a conventional light-reflection type liquid crystal display device including a preliminary light source.
Figure 2:
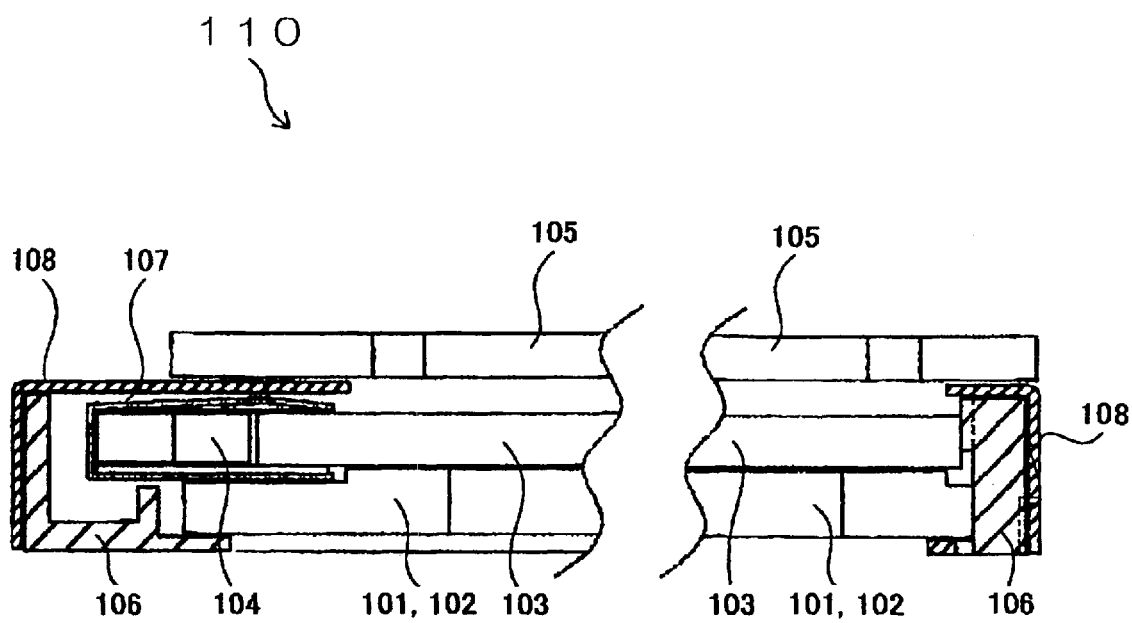
FIG. 2 is a cross-sectional view of another conventional light-reflection type liquid crystal display device.

Thus, the shield 18 and the frame 17 do not overlap each other unlike the conventional light-reflection type liquid crystal display device 110 illustrated in FIG. 2, resulting in that the light-reflection type liquid crystal display device 10 in accordance with the embodiment can be formed thinner than the conventional light-reflection type liquid crystal display device 110 by a thickness equal to a thickness of the shield 18.

As mentioned above, the operation panel 15 is supported at a right end (see FIG. 6) on the shield 18.

Figure 3:
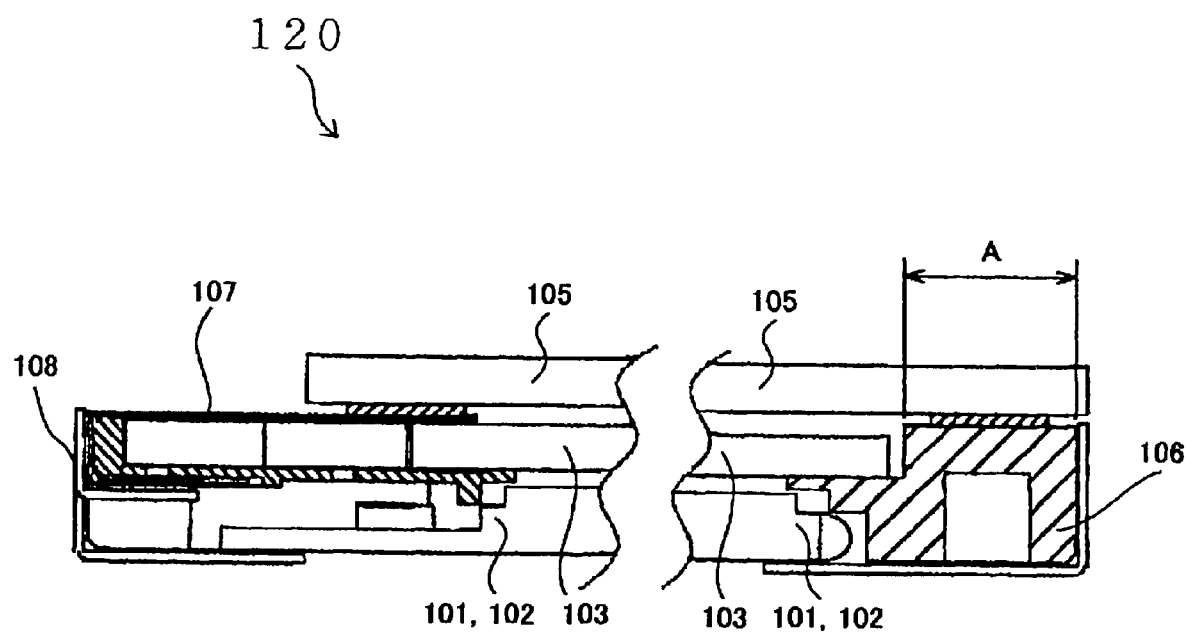
FIG. 3 is a cross-sectional view of still another conventional light-reflection type liquid crystal display device.

Thus, it is no longer necessary for light-reflection type liquid crystal display device 10 to support the operation panel 105 with a chassis having a width "A" unlike the conventional light-reflection type liquid crystal display device 120 illustrated in FIG. 3, ensuring that the light-reflection type liquid crystal display device 10 can be formed shorter in width.

The shield 108 in each of the conventional light-reflection type liquid crystal display devices 110 and 120 illustrated in FIGS. 2 and 3 is in the form of a frame. In contrast, the shield 18 in the light-reflection type liquid crystal display device 10 is open at one of sides, when viewed from upward. Hence, it is possible to reduce a volume of a material of which the shield 18 is formed, in comparison with the conventional shield 108. For instance, when a plurality of the shields 18 is cut out of a single plate, the greater number of the shields 18 can be taken out of the plate than the conventional shield 108 by arranging openings of the shields 18 to face each other. Thus, fabrication costs of the light-reflection type liquid crystal display device 10 can be reduced in comparison with the conventional light-reflection type liquid crystal display devices 110 and 120.

In the above-mentioned embodiment, the shield 18 is formed with the openings 18f to 18i, and the chassis 16 is formed with the projections 16f to 16i. In contrast, the chassis 16 may be formed with openings, and the shield 18 may be formed with projections which are fit into the openings of the chassis 16.

It is not always necessary for the shield 18 to be designed to be detachably coupled to the chassis 16. The shield 18 may be fixedly coupled to the chassis 16.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2002-157423 filed on May 30, 2002 including specification, claims, drawings and summary is incorporated herein by reference in its entirety.

What is claimed is:

1. A light-reflection type liquid crystal display device comprising:
   (a) a liquid crystal display panel;
   (b) a polarizer mounted on said liquid crystal display panel;
   (c) a light-guide mounted on said polarizer;
   (d) a light source arranged adjacent to an end of said light-guide for supplying light to said liquid crystal display panel through said light-guide;
   (e) an operation panel located on a side of said light-guide opposite from said polarizer for operating said light-reflection type liquid crystal display device;
   (f) a chassis for supporting said liquid crystal display panel therewith;
   (g) a frame covering said light source therewith, said frame having an opening facing said light-guide, an upper surface of said frame being in contact with a portion of said operation panel for supporting said operation panel; and
   (h) a shield coupled to said chassis and covering a portion of said light-guide, an upper surface of said shield being in contact with a portion of said operation panel for cooperating with said frame to support said operation panel.

2. The light-reflection type liquid crystal display device as set forth in claim 1, wherein said shield is detachably coupled to said chassis.

3. The light-reflection type liquid crystal display device as set forth in claim 2, wherein one of said shield and said chassis is formed with a plurality of openings, and the other is formed with projections which fit into said openings.

4. The light-reflection type liquid crystal display device as set forth in claim 3, wherein one of plurality of said openings has an axis extending in a different direction from a direction in which an axis of another one of plurality of said openings extends.

5. The light-reflection type liquid crystal display device as set forth in claim 2, wherein one of said shield and said chassis is formed with a plurality of openings, and the other is formed with projections which fit into said openings, said shield is formed with a hook which makes abutment with said chassis, and said opening or projection of said shield is engaged to a first wall of said chassis and said hook is engaged to a second wall of said chassis facing said first wall.

6. The light-reflection type liquid crystal display device as set forth in claim 1, wherein said upper surface of said shield is coplanar with said upper surface of said frame when said shield is coupled to said chassis.

7. The light-reflection type liquid crystal display device as set forth in claim 6, wherein said operation panel is supported on both said shield and said frame at a side where said light source exists, and on said shield at an opposite side.

8. A shield used in a light-reflection type liquid crystal display device having a liquid crystal display panel; a polarizer mounted on said liquid crystal display panel; a light-guide mounted on said polarizer; a light source arranged adjacent to an end of said light-guide for supplying light to said liquid crystal display panel through said light-guide; an operation panel located on a side of said light-guide opposite from said polarizer for operating said light-reflection type liquid crystal display device; a chassis for supporting said liquid crystal display panel therewith; and a frame covering said light source therewith, said frame having an opening facing said light-guide, an upper surface of said frame being in contact with a portion of said operation panel for supporting said operation panel, said shield comprising:
   at least one side surface for coupling said shield to said chassis, and
   an upper surface covering a portion of said light-guide, said upper surface of said shield being in contact with a portion of said operation panel and cooperating with said upper surface of said frame to support said operation panel.

9. The shield as set forth in claim 8, wherein said shield is detachably coupled to said chassis.

10. The shield as set forth in claim 8, wherein said shield is formed with a plurality of openings or a plurality of projections which fit into said openings, and said chassis is formed with the other.

11. The shield as set forth in claim 10, wherein one of plurality of said openings has an axis extending in a different direction from a direction in which an axis of another one of plurality of said openings extends.

12. The shield as set forth in claim 8, wherein said shield is formed with a plurality of openings or a plurality of projections which fit into said openings, and said chassis is formed with the other, said shield is formed with a hook which makes abutment with said chassis when said shield is coupled to said chassis, and said opening or projection of said shield is engaged to a first wall of said chassis and said hook is engaged to a second wall of said chassis facing said first wall.

13. The shield as set forth in claim 8, wherein said upper surface of said shield is coplanar with said upper surface of said frame when said shield is coupled to said chassis.

14. The shield as set forth in claim 8, wherein said operation panel is supported on both said shield and said frame at a side where said light source exists, and on said shield at an opposite side.

* * * * *